US010893229B1

United States Patent
Moore et al.

(10) Patent No.: US 10,893,229 B1
(45) Date of Patent: Jan. 12, 2021

(54) DYNAMIC PIXEL RATE-BASED VIDEO

(71) Applicant: Amazon Technologies, Inc., Seattle, WA (US)

(72) Inventors: Kevin Moore, Portland, OR (US); Ryan Hegar, Happy Valley, OR (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/588,623

(22) Filed: Sep. 30, 2019

(51) Int. Cl.
*H04N 7/01* (2006.01)
*H04N 21/44* (2011.01)

(52) U.S. Cl.
CPC ..... *H04N 7/0127* (2013.01); *H04N 21/44004* (2013.01)

(58) Field of Classification Search
CPC .................. H04N 7/0127; H04N 21/44004
USPC ......................................................... 348/441
See application file for complete search history.

(56) References Cited

U.S. PATENT DOCUMENTS

| | | | | |
|---|---|---|---|---|
| 4,695,883 | A * | 9/1987 | Chandler | H04N 19/503 348/14.15 |
| 6,496,601 | B1 * | 12/2002 | Migdal | G06T 9/001 382/239 |
| 2014/0204133 | A1 * | 7/2014 | Odom | G09G 5/14 345/694 |
| 2019/0012531 | A1 * | 1/2019 | Radwin | G06K 9/00771 |
| 2019/0221185 | A1 * | 7/2019 | Grossman | G09G 5/005 |

* cited by examiner

*Primary Examiner* — Michael Lee
(74) *Attorney, Agent, or Firm* — Nicholson De Vos Webster & Elliott, LLP (57) ABSTRACT

Techniques for video with dynamic pixel update rates are described. A first video frame is received from a video source, the first video frame having a first pixel value at a first frame location of a plurality of frame locations, wherein the first frame location includes a horizontal pixel location and a vertical pixel location. A second video frame is received from the video source, the second video frame having a second pixel value at the first frame location. The first frame location is identified based at least in part on determining a difference between the first pixel value and the second pixel value. A package including a pixel update value and an indication of the first frame location is sent to a video destination, wherein the pixel update value is based at least in part on the second pixel value.

20 Claims, 8 Drawing Sheets

DYNAMIC PIXEL RATE-BASED VIDEO

BACKGROUND

Video frame rates in the United States and Europe have been approximately 30 frames-per-second (fps) and 25 fps respectively since the invention of television. Note the addition of a color sub-carrier in the 1950s resulted in slight slowing of the scan rate (e.g., to 29.97 fps in the US). These rates were chosen for several reasons: they were fast enough to simulate fluid motion; they were fast enough to avoid flickering (slower refresh rates can cause pixels to fade before being hit again by the electron gun in older televisions); and they were intentionally chosen to be half the frequency of the alternating-current (AC) electricity powering the device (60 Hz in the United States and 50 Hz in Europe). To date, subsequent improvements to video have only increased resolutions and yielded frame rates generally as multiples of those originally developed (e.g., 720p60 and 1080i30).

BRIEF DESCRIPTION OF DRAWINGS

Various embodiments in accordance with the present disclosure will be described with reference to the drawings, in which.

DETAILED DESCRIPTION

The present disclosure relates to methods, apparatus, systems, and non-transitory computer-readable storage media for video applications using dynamic pixel update rates. Even with the advent better video resolutions (e.g., 4K) and faster video frame rates (e.g., 120 fps), modern video systems are still beholden to the old timing and frame rate interval concepts that were developed by analog standards in the early 1900s (e.g., 30 fps). In practice, that means those systems use video processing and transmission techniques that still rely on the notion of frames, where information representing complete frames is transmitted from a source to a destination. For example, modern video compression techniques (e.g., H.26x) still rely on encoding and transmitting information representing entire frames (e.g., whether through I-frames, P-frames, or B-frames) and delivering the entirety of those frame representations for display or other use at particular frame rate.

At a high level, the present disclosure diverges from traditional frame-based video by introducing video having dynamic pixel rates. Under such a "pixel-based" approach to video, every pixel can have its own refresh rate, potentially limited only by the per-pixel update rate of the hardware (e.g., a sensor or other video source). In effect, rather than being tied to the traditional notions of frame rate such as 30 fps video, a per-pixel refresh rate—untethered to the convention frame rate—can be considered the "native" rate of the content. As a result, different pixels in the video can be transmitted and therefore updated at different rates. For example, pixels representing a bouncing ball can be encoded and transmitted such that they refresh faster than other pixels representing a static background. Some pixels may be refreshed at the maximum or native pixel update rate (e.g., 1 ms), while other pixels may be updated at a much slower rate (e.g., 2 ms, 7 ms, 1000 ms, etc.).

Decoupling pixel updates from frame rates has several advantages. For example, when pixel updates are untethered to frame rates, information representing less than the entirety of a frame can be transmitted between sources and destinations. Consequently, dynamic pixel rate-based video can be considered a form of compression, eliminating the need to transmit information representing an entirety of a frame according to a specified frame rate (such information can include encodings of or references to redundant and possibly previously transmitted information). Another advantage of dynamic pixel rate-based video is that the resulting video can be perceived by a viewer as higher quality as compared to video having a fixed frame rate since portions of the video having higher motion or change can be updated at higher rates than would be possible under frame-based approaches. When some portions of a scene change faster than other portions of a scene, those faster changing portions can ultimately be rendered to a viewer at a faster rate than those other portions.

Additionally, by decoupling pixel updates from frame rates, video processing operations can operate on portions of the video stream without regard to the frame rate, eliminating the need for synchronization amongst various video processing stages and/or video sources. Eliminating synchronization is of particular advantage in cloud-based video processing applications, where the computer systems performing the video processing applications may be allocated at runtime and subject to varying delays and that inherently make the synchronization across systems challenging. In cloud processing, it is sometimes desirable or necessary to process a single video frame across several virtualized computer systems (sometimes referred to as instances) or to process several video sources independently for later compositing by a production switcher, introduction of digital video effects, or modification via downstream graphics insertion. In the past, the components performing each of these operations were pieces of hardware that were connected in series. When switching between sources, the timing between signals had to be aligned so that the splicing equipment could cut the linear signal in a way that was undetectable to the viewer. This was done by "frame syncing" each source to the system so that the beginning of each video frame was aligned temporally across all sources. Such frame syncing is challenging in the cloud for the reasons described above. By moving to a dynamic pixel rate-based video, frame synching can be avoided. If a video sink of dynamic pixel rate-based video can update pixels at any interval, and each pixel has a unique address, the video buffer can be updated dynamically, at any time, and individual pixels can be updated too.

In some embodiments, frame-based video is converted into dynamic pixel rate-based video by identifying changes between frames and encoding those changes as pixel-level updates. Change may be defined in a variety of ways, such as by performing a per-pixel comparison (e.g., of the pixel components such as RGB, YCbCr, etc.) to identify differences in pixels between frames. A threshold can be used to filter out differences to minimum differences that will be encoded. To encode the dynamic pixel rate-based video, the changed pixel values are combined with metadata such as pixel location and timing information. The pixel values and metadata are transmitted, allowing a recipient to perform sub-frame updates to the pixels in a frame buffer according to the specified metadata. If conversion to a frame-based approach is needed, dynamic pixel rate-based video can be converted into frame-based video by periodically capturing the frame buffer to which pixel-updates are being applied according to the desired output frame rate, according to some embodiments.

In some embodiments that employ a pixel-based approach, video processing operations (e.g., graphics insertion, combining video sources, etc.) are performed with reference to pixel timing rather than frame timing. In contrast, such operations performed under a frame-based approach often require special handling to synchronize each of the components (graphics, various video sources, etc.). For example, a multi-viewer typically allows multiple video sources to be combined onto a single video stream (e.g., for a news feed with several talking heads, security camera footage, etc.). Rather than synchronize each source to a common clock, the multi-viewer operating in the pixel-space can independently update pixels in its combined video output according to the timing of pixel-based updates received from each of the video sources (e.g., update the pixels in the top right portion of the frame at a different time than updating the pixels in the bottom right portion of the frame).

Figure 1:
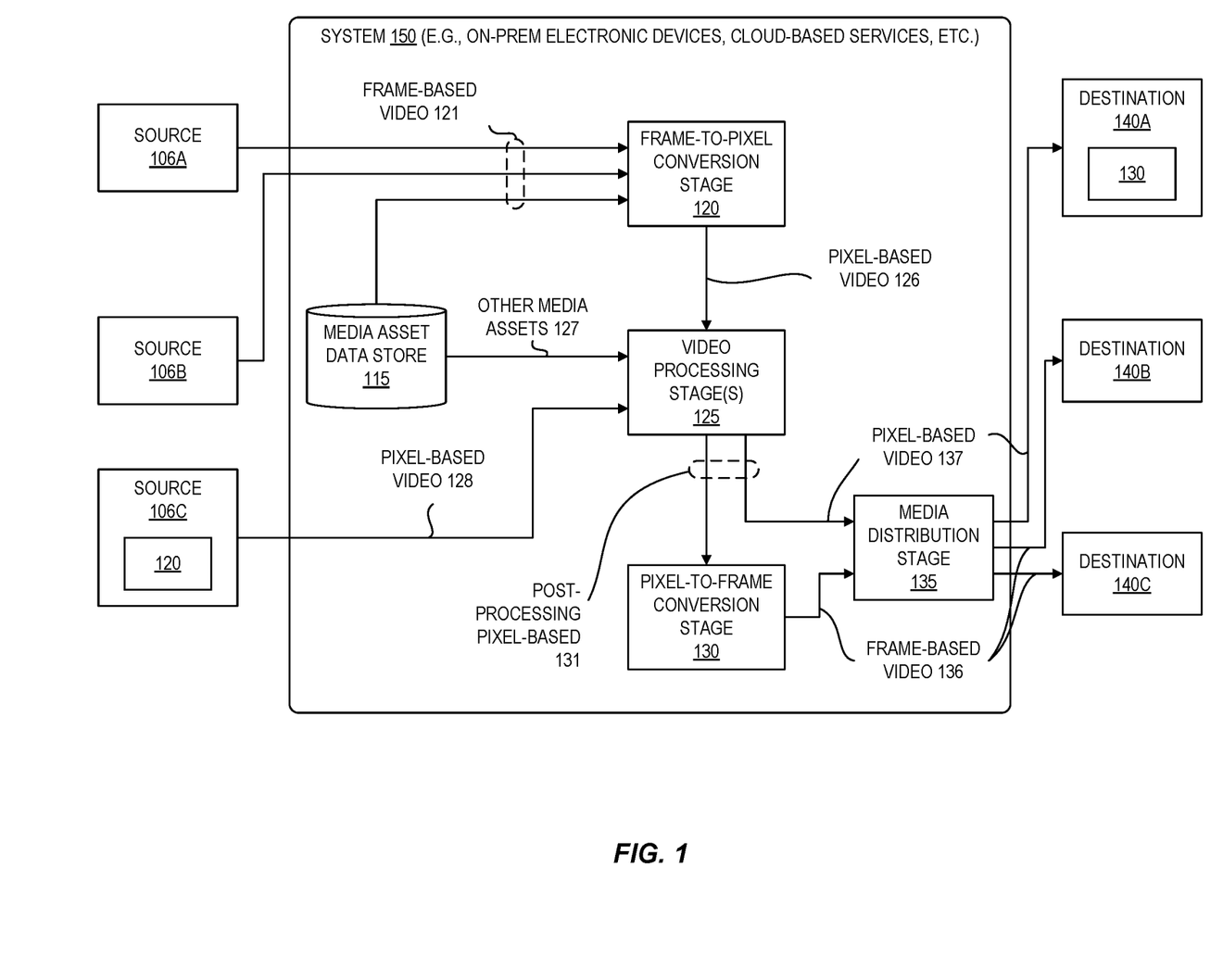
FIG. 1 is a diagram illustrating an exemplary video processing environment using dynamic pixel rate-based video according to some embodiments.

FIG. 1 is a diagram illustrating an exemplary video processing environment using dynamic pixel rate-based video according to some embodiments. In the illustrated environment, an exemplary system 150 receives video from several video sources—sources 106A-106D—and sends video to several video destinations—destinations 140A-140C. As illustrated, the system 150 includes a media asset data store 115 (e.g., storage devices), a frame-to-pixel conversion stage 120, one or more video processing stages 125, a pixel-to-frame conversion stage 130, and a media distribution stage 135. Note that as used herein, dynamic pixel rate-based video is also referred to as "pixel-based" video, whereas traditional frame-based video (e.g., video tied to a frame rate) is referred to as "frame-based" video.

The frame-to-pixel conversion ("F2P") stage 120 receives frame-based video 121 from sources 106A and 106B and from the media asset data store 115 (e.g., a pre-recorded video). The F2P stage 120 converts frame-based video to pixel-based video. Additional details on the conversions are provided below with reference to FIGS. 2 and 3.

The video processing stage(s) 125 can perform one or more video processing operations to generate a pixel-based video output based on the one or more pixel-based videos 126, 128. The video processing stage 125 receives pixel-based video 126 from the F2P stage 120 (e.g., a pixel-based video for each of the three sources processed by the F2P stage 120). The video processing stage 125 can also receive other media assets 127 from the media asset data store 115. The other media assets 127 can include graphics, audio, or previously stored pixel-based video.

Various video processing operations include switching (e.g., switching between one source and another source), compositing (e.g., combining multiple video inputs into a single video output), and digital video effects (e.g., graphics insertion, etc.). Operating on pixel-based video, the video processing stages 125 can perform these operations irrespective of any frame timing that may have been specified as part of the frame-based video 121 (e.g., 30 fps, 60 fps, etc.). In particular, the video processing stages 125 can maintain a frame buffer but modify subsets of the pixels in those frame buffers without synchronizing to the frame timing of any one of the frame-based videos 121. This is particularly useful when the frame-based videos 121 are out of sync. For example, assuming that each of the frame-based videos 121 was a 30-fps video having a 33 millisecond (ms) period, the video processing stages 125 can modify portions of the frame buffer at times other than either of the 33 ms periods. The video processing stage 125 can receive updates from the F2P stage 120 based on a first one of the potentially out-of-sync sources at 0 ms, 33 ms, 66 ms, and so on to. The video processing stage 125 can also receive updates from the F2P stage 120 based on the second source at 15 ms, 48.3 ms, 81.6 ms, and so on. The video processing stage 125 can apply updates to the portion of its frame buffer based on the first source at 0 ms, 33 ms, 66 ms and updates to a different portion of its frame buffer based on the second source at 15 ms, 48 ms, 81 ms. Additionally, the video processing stage 125 can even make modifications to the frame buffer in between updates originating from the frame-based videos 121 (e.g., a graphics insertion at 4 ms).

The pixel-to-frame conversion ("P2F") stage 130 receives pixel-based video 131 from the video processing stage 125. The P2F stage 130 converts pixel-based video to frame-based video. Additional details on the conversions are provided below with reference to FIG. 6.

The media distribution stage 135 can package video for distribution to destinations 140A-140C. Various distribution techniques can be employed, from those based on Society of Motion Picture and Television (SMPTE) standards to MPEG-DASH, HTTP Live Streaming, etc. The media distribution stage 135 receives pixel-based video 137 for distribution to the destination 140A having support for pixel-based video. The media distribution stage 135 also receives frame-based video 136 from the P2F stage 130 for distribution on frame-based channels to the destinations 140B and 140C.

The processing techniques of the F2P stage 120 can be incorporated into the source 106C (e.g., camera sensor electronics) to provide the pixel-based video 128. Likewise, the processing techniques of the P2F stage 130 can be incorporated into the destination 140A (e.g., a decoder, display electronics, etc.) to receive and process or render the pixel-based output 137.

In the example system 150 illustrated in FIG. 1, the various stages are applications or services implemented as software programs such as sets of instructions for execution by a processor. Those processors can be part of on-premises ("on-prem") computer systems or cloud-based computer systems. Cloud-based computer systems can be part of a cloud provider network (or just "cloud") that typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services. Other embodiments may incorporate portions or all of the components of various stages as hardware or other logic components (e.g., special-purpose hardware such as application-specific integrated circuits) in on-prem or cloud-based computer systems.

Figure 2:
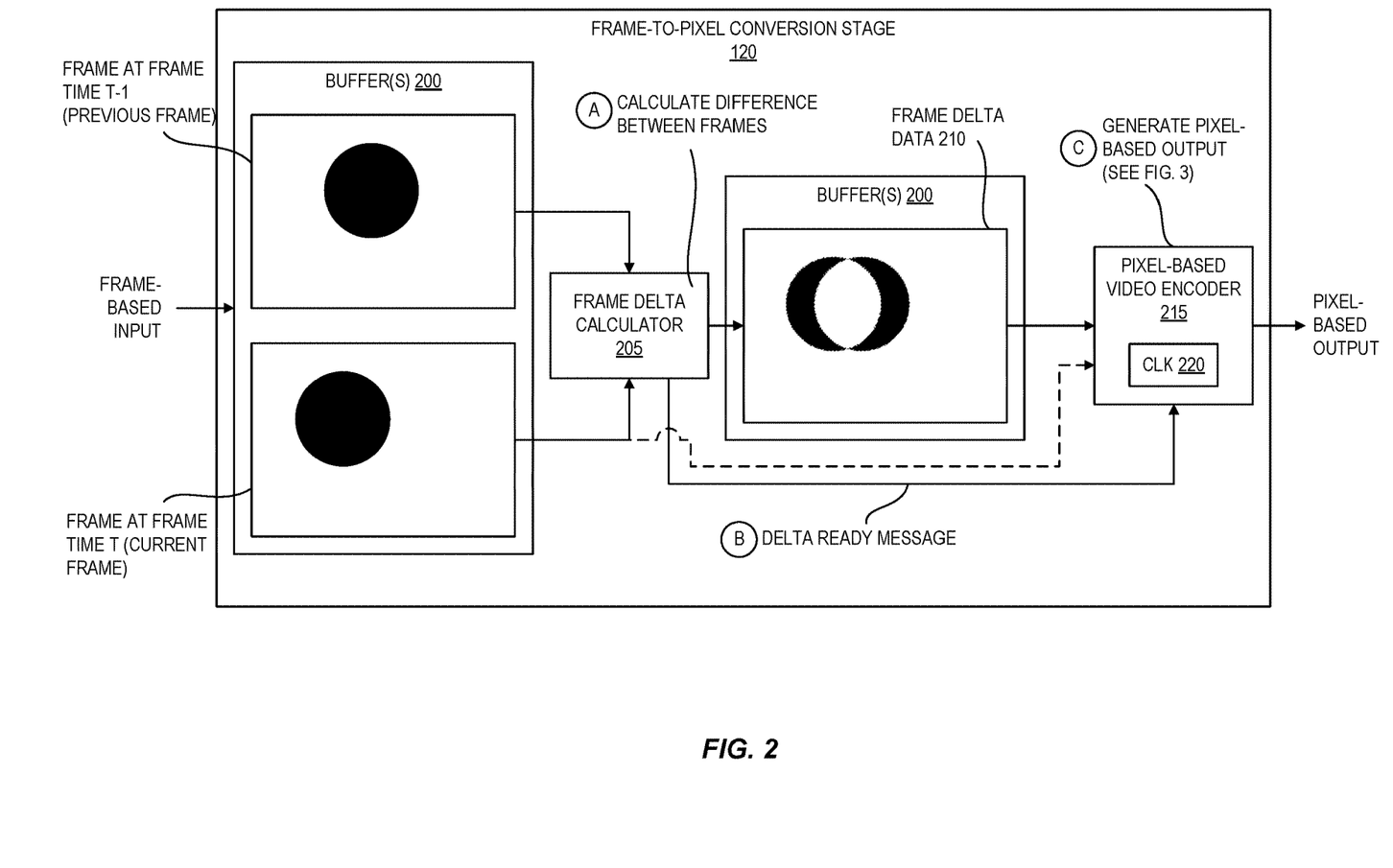
FIG. 2 is a diagram illustrating an exemplary technique for converting from video having a frame rate to video having a dynamic pixel rate according to some embodiments.

FIG. 2 is a diagram illustrating an exemplary technique for converting from video having a frame rate to video having a dynamic pixel rate according to some embodiments. The F2P stage 120 receives frame-based video (e.g., sequential uncompressed frames) and outputs a pixel-based video. As illustrated, the F2P stage 120 includes one or more buffers 200 in which to store received frames and frame deltas, a frame delta calculator 205, and a pixel-based video encoder 215 ("encoder 215"). To conceptually illustrate the process of converting from frame-based to pixel-based video, the frame data is spatially illustrated to depict a circle moving from right to left between the frame at time t−1 (previous frame) and the frame at time t (current frame). As indicated at the encircled letter A, the frame delta calculator 205 calculates the difference, or delta, between the current frame and the previous frame and stores that delta data 210 in a buffer 200. Such a calculation may be a normalized difference between each corresponding pixel in the frames. For example, the delta may be represented by the magnitude of the difference vector between the pixel vector from one frame and the pixel vector in the other frame in whatever space is used to represent pixel values (e.g., YCbCr). Upon completing the calculation, the frame delta calculator can send a message (or some other form of signal) to the encoder 215, as indicated at circle B, to indicate to the encoder 215 that the frame delta 210 has been calculated.

As indicated at circle C, the encoder 215 generates a pixel-based output by packaging updated pixel data as well as associated timing and location data for those updated pixels. In some embodiments, the encoder 215 identifies the pixels to package into the pixel-based output based on the non-zero valued pixel locations in the frame-delta data 210. For example, if there are 1,000 pixels with non-zero values in the frame delta data 210 upon receipt of the delta ready message, the encoder 215 can package updated pixel values for those 1,000 pixels, a timestamp to indicate to a downstream component the time to apply the updated pixel value to those 1,000 pixels, and location data to locate those 1,000 pixels in the frame. Of note, the encoder 215 does not package information or data representing pixels that have not changed, in some embodiments.

The encoder 215 can encode the pixel values (also referred to as pixel update values) as either relative to the previous value or as an absolute value. When using the relative values, the encoder 215 can send the updated pixel value as the value represented in the delta data 210, and the recipient of that relative value can apply that change to a value for that pixel maintained by the recipient. When using absolute values, the encoder 215 can send the actual value of the pixel as represented in the current frame (as indicated by the dashed line).

The encoder 215 can encode location data for the updated pixels in an absolute or relative manner In the absolute case, the encoder 215 can include a pixel location for each pixel value. To limit the amount of metadata transmitted in the pixel-based video, the encoder can alternatively include location data for groups of pixels. For example, if 30 consecutive pixels of a line in a frame are changed, the encoder 215 can locate those 30 pixels using a line and a starting pixel identifier (e.g., line 200, pixel 30). As yet another example, if a 100×100 block of pixels have changed, the encoder 215 can locate those 10,000 pixels using two coordinates (e.g., a line and pixel identifier of the top left of the block and a line and pixel identifier of the bottom right of the block; a line and pixel identifier of the top left of the block and the dimensions of the block, etc.) Note that in such cases where blocks of pixels are transmitted, image compression techniques can be applied to those blocks prior to transmission.

The astute reader will note that the timing data from a single frame-based input will remain relative to the associated frame rate since frame delta data 210 is calculated on the frame cadence. A downstream recipient of multiple pixel-based outputs can combine those potentially out-of-sync sources, as described below with reference to FIGS. 4 and 5.

In some embodiments, the timing data packaged with updated pixel data can be the frame timestamp converted to the pixel clock 220 time adjusted based on when the first frame was received relative to the pixel clock 220. For example, assuming a 1 kHz pixel clock, a 33 ms interval between frames at the input, and the first frame was received at pixel clock 220 time X, the timing data for the update of the second frame can indicate X+33, the update of the third frame can indicate X+66, and so on. Note that the encoder 215 can send an indication of the tick rate of its pixel clock (e.g., 1 ms or 1 kHz) in its transmission of a pixel-based output.

Figure 3:
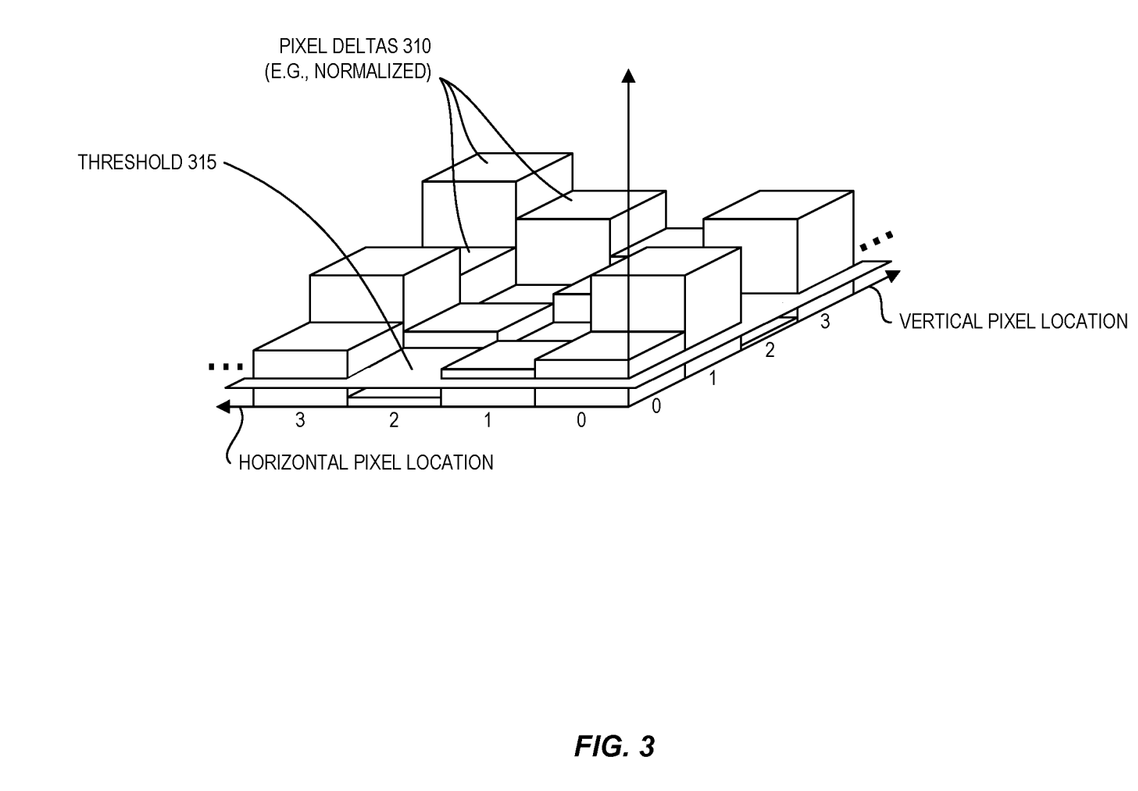
FIG. 3 is a diagram illustrating an exemplary technique for filtering pixel-based updates to be transmitted in dynamic pixel rate-based video according to some embodiments.

FIG. 3 is a diagram illustrating an exemplary technique for filtering pixel-based updates to be transmitted in dynamic pixel rate-based video according to some embodiments. As noted above, in some embodiments the encoder 215 can package pixel values and location and timing data for non-zero values in the frame delta data 210. In other embodiments, the encoder 215 can apply a threshold to the deltas as a form of compression, thereby avoiding packaging pixel updates for pixels that have not changed by more than the threshold. As illustrated, the encoder can compare the pixel deltas 310 (e.g., the normalized difference between pixels in consecutive frames) to a threshold 315. The encoder 215 can ignore pixels that have changed by less than a threshold. In this example, the pixel deltas 310 of the pixels at locations (0,2) and (2,0) are below the threshold, and could thus be ignored during the encoding of that pixel update in the pixel-based output.

To avoid ignoring slow changing pixels, the encoder 215 can sum the deltas for any ignored pixel over time when performing the threshold comparison. For example, if a pixel changes by half of the threshold between a first two frames and by the other half of the threshold in a third frame, the encoder can encode that pixel based on the cumulative sum of the deltas over time exceeding the threshold.

Figure 4:
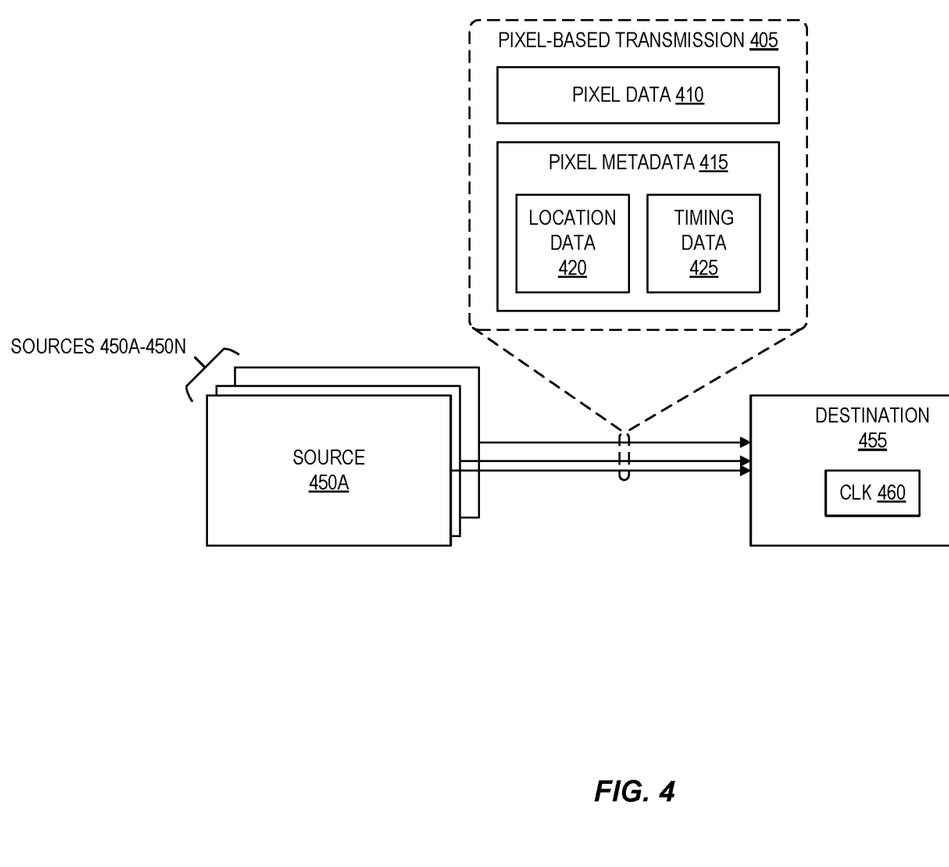
FIG. 4 is a diagram illustrating an exemplary format for transmitting dynamic pixel rate-based video according to some embodiments.

FIG. 4 is a diagram illustrating an exemplary format for transmitting dynamic pixel rate-based video according to some embodiments. In transmitting pixel-based video, a pixel-based transmission 405 can include consecutive packages of pixel updates sent from a source 450A to a destination 455. Each package can include pixel data 410 and pixel metadata 415. The pixel data 410 includes pixel value updates such as described above with reference to FIG. 2, and the pixel metadata 415 includes location data 420 and timing data 425, also as described above with reference to FIG. 2.

As indicated above, the recipient of the pixel-based output—here, the destination 455—can combine the pixel-based outputs from several potentially out-of-sync sources 450A-450N. In such a scenario, the destination 455 can reference a "pixel clock" 460 and perform updates on its frame buffer according to the relative pixel timing data 425 received from each of the sources 450. Upon receipt of the initial pixel-based transmission 405 from a given source 450, the destination 455 can sync that timing data to the pixel clock. For example and assuming a common frequency between the source clock and the destination clock, if the first pixel-based transmission 405 from source 450A includes timing data 425 indicating pixel updates at time 0 while the clock 460 is at time 10,000, the destination 455 can apply pixel-based updates from source 450A to its frame buffer based on an offset of −10,000. Similarly, if the first pixel-based transmission 405 from source 450B includes timing data 425 indicating pixel updates at time 0 while the clock 460 is at time 12,000, the destination 455 can apply pixel-based updates from source 450B to its frame buffer based on an offset of −12,000. If the frequencies of the source and destination clock are different, the destination can adjust the timing of the received timestamps to scale them to the clock 460.

Figure 5:
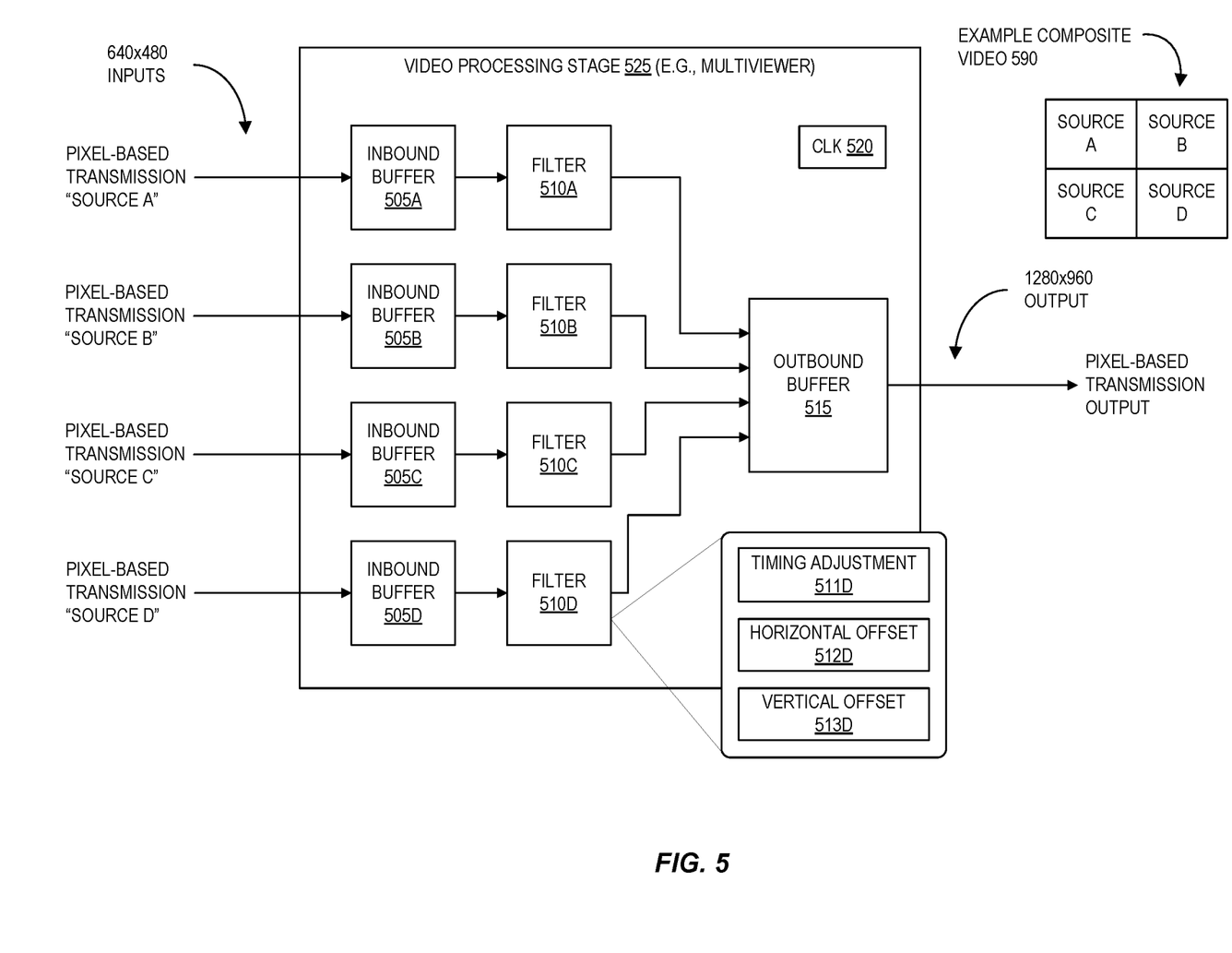
FIG. 5 is a diagram illustrating an exemplary video processing stage using dynamic pixel rate-based video according to some embodiments.

FIG. 5 is a diagram illustrating an exemplary video processing stage using dynamic pixel rate-based video according to some embodiments. The video processing stage 525 illustrated here is a multi-viewer that composites four 640×480 pixel-based transmissions—source A through source D—and outputs a 1280×960 pixel-based transmission as shown in the example composite video 590. The transmission from source A is buffered in an inbound buffer 505A, processed by a filter 510A and sent to an outbound buffer 515, the transmission from source B is buffered in an inbound buffer 505B, processed by a filter 510B and sent to the outbound buffer 515, the transmission from source C is buffered in an inbound buffer 505C, processed by a filter 510C and sent to the outbound buffer 515, the transmission from source D is buffered in an inbound buffer 505D, processed by a filter 510D and sent to the outbound buffer 515 for subsequent transmission in a pixel-based output.

Each of the filters operates on the pixel metadata in the respective source transmission, now described for filter the 510D. The filter 510D includes a timing adjustment 511D, a horizontal offset 512D, and a vertical offset 513D. In this example, source D in the composite frame 590 is in the lower right of the frame. Accordingly, the filter 510D can apply the horizontal offset 512D of +640 and the vertical offset 513D of +480 to the location data in the source D transmission.

The timing adjustment 511D is subject to the initial difference between the timing data in the source D transmission and a "pixel" clock 520 of the video processing stage 525. For example, if the timing data in the source D transmission is 500 Hz with an initial timestamp of 400 and the clock 520 was 1 kHz, the timing adjustment 511D would subtract 400 from the received timing data and scale the result by a factor of two (e.g., an input timestamp 400 corresponds to an output timestamp 0, an input timestamp 500 corresponds to an output timestamp 200, etc.).

The description of filter 510D is applicable to the other filters 510A-510C but with different offsets for the timing, horizontal, and vertical offsets (e.g., filter 510A can have horizontal and vertical offsets of zero because source A in the composite frame remains in the top left of the frame).

Note that the transmissions from the upstream sources A through D do not need to be synchronized in order to form the composite frame 590. The four portions of the composite frame 590 originating from sources A through D can update at different times with the video processing stage 525 maintaining their relative relationship. Additionally, because the pixel-based transmissions can include fewer than all of the pixels in their 640×480 size, pixels within a given portion of the four portions of the composite frame 590 can be updated at different times.

Figure 6:
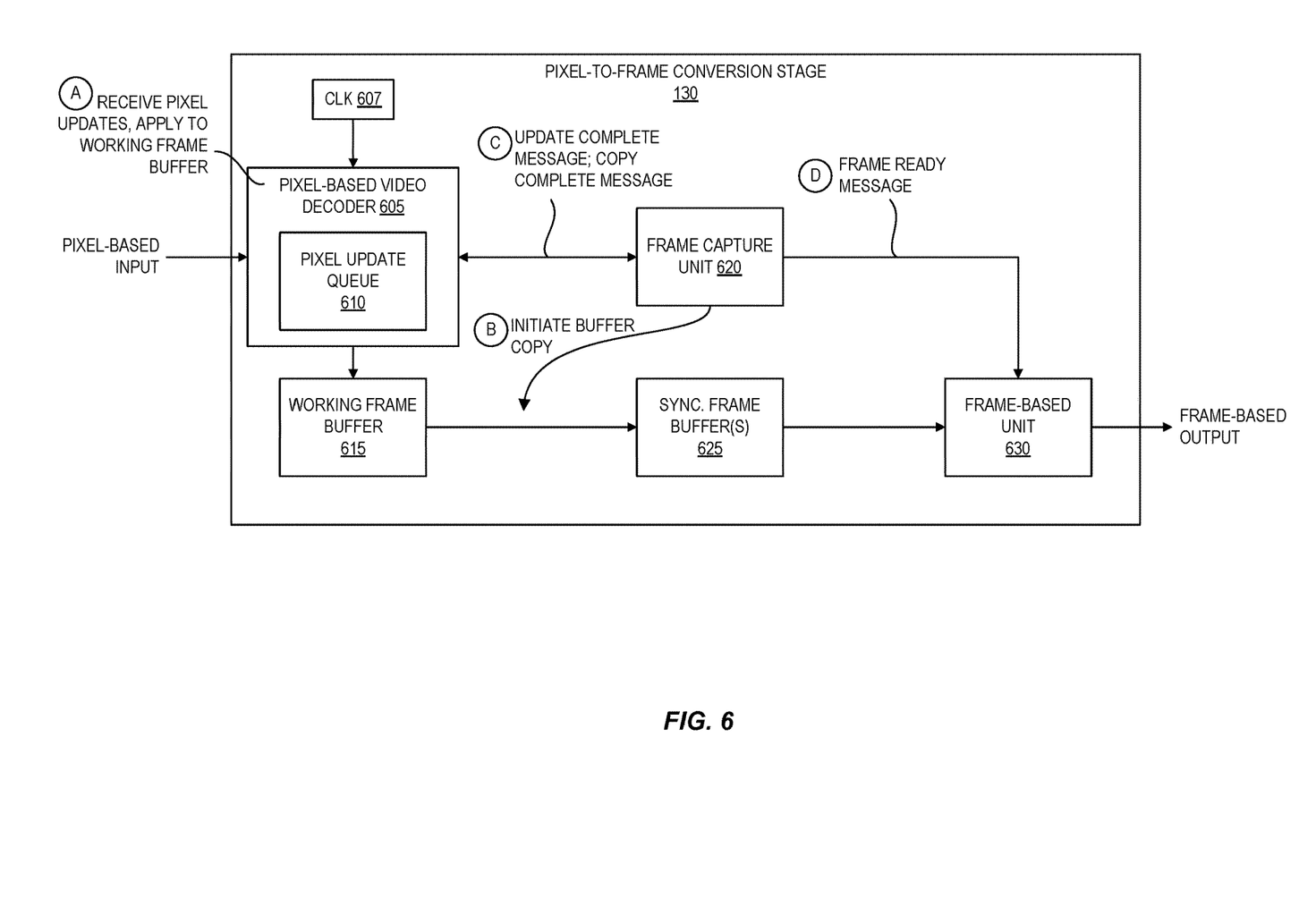
FIG. 6 is a diagram an exemplary technique for converting from video having a dynamic pixel rate to video having a frame rate according to some embodiments.

FIG. 6 is a diagram an exemplary technique for converting from video having a dynamic pixel rate to video having a frame rate according to some embodiments. The P2F stage 130 receives pixel-based video and outputs frame-based video. The output frame-based video can be compressed by, for example, the media distribution stage 135 for distribution. As illustrated, P2F stage 130 includes a pixel-based video decoder 605, a clock 607, a working frame buffer 615, a frame capture unit 620, synchronous frame buffers 625, and a frame-based unit 630.

As indicated at circle A, the pixel-based video decoder 605 ("decoder 605") receives pixel-based transmissions, such as the one illustrated in FIG. 4, from one or more pixel-based sources. The decoder 605 can add received transmissions to a pixel update queue 610 that includes both the pixel data (e.g., pixel data 410) and the pixel metadata (e.g., pixel metadata 415). The decoder 605 applies queued pixel updates to a working frame buffer 615 that allows for individual pixel updates. The decoder 605 updates the pixel locations in the working frame buffer 615 corresponding to the locations in the pixel metadata with the corresponding values in the pixel data. For example, if the pixel at coordinate (322, 500) has an updated pixel value, the decoder 605 updates the memory location in the frame buffer representing that location with the updated value. The timing of the applied updates can be based on a "pixel clock" 607 and the received timing data such as described above with reference to destination 455.

As indicated at circle B, the frame capture unit 620 initiates a copy of the working frame buffer 615 to the full frame buffer (e.g., using memcpy). The frame capture unit 620 initiates such copy operations at an interval based on the frame rate of the desired frame-based output. For example, if the desired frame rate of the output is 30 fps, the frame capture unit 620 can initiate the copy approximately every 33.3 ms. The synchronous frame buffer thus contains full frames synchronized to the frame rate as determined by the frame capture unit 620. Note that multiple synchronous frame buffers 625 can be used (e.g., using a double-buffering scheme).

As indicated at circle C, the decoder 605 can send update complete messages to the frame capture unit 620. Such messages can ensure the copy operation is performed between updates to the working frame buffer 615 so as to avoid copying partially updated frames (e.g., because the decoder 605 is updating the working frame buffer 615 according to the clock 607, and the clock 607 is likely faster than the desired frame rate of the output). Further, the frame capture unit 605 can send copy complete messages to the decoder 605 to cause the decoder 605 to delay applying updates to the working frame buffer 615 while the copy operation is in process. Note that since the working frame buffer 615 is likely updated at a higher frequency than the copies to the synchronous frame buffer 625, the frame capture unit 605 can automatically send the copy complete message to the decoder 605 upon receipt of update complete messages that fall between the intervals of the desired frame rate.

Note that if the delay exceeds the timing of the next queued pixel update, the decoder 605 can "catch up" once the copy completes by performing the queued pixel updates in order based on their associated timestamps. For example, if the queue includes pixel updates at clock 607 times 10, 11, and 12, the decoder 605 may send an update complete message after applying the update at time 10 but not receive a copy complete message until after time 11. In such a scenario, the decoder would perform the updates in order until it caught up to the clock (e.g., the time 11 update followed by the time 12 update).

As indicated at circle D, the frame capture unit 620 sends a frame ready message to a frame-based unit 630 upon completing the copy to the synchronous frame buffer 625. The frame-based unit 630 may be an encoder, a display, or other such device that operates on full frames. Upon receipt of the frame ready message from the frame capture unit 620, frame-based unit 630 processes the frame copied into the synchronous frame buffers 625. For example, the frame-based unit 630 may be a video encoder that encodes the frames in the synchronous frame buffers 625 according to a standard such as H.26x for subsequent distribution. As another example, the frame-based unit 630 may be a display device that visually outputs video from the synchronous frame buffers 625.

By processing video in a pixel-based format as described herein, video processing applications such as production switchers and multi-viewers no longer need each source to be timed perfectly. That is, the frame rates of frame-based video 121 need not be synchronized, nor do the clocks amongst the various stages of the video processing pipeline (e.g., the clock in an upstream device such as clock 220 can operate independently of the clock in a downstream device such as clock 460, clock 520, or clock 607). By using whatever data is in the frame buffer of the available source, content can be mixed that would otherwise not be possible with electronic linear equipment. This is because a frame buffer can be captured and serialized independent of any source frame rates. For example, a multi-viewer might composite nine discrete camera feeds in a nine-split. Traditionally, this was done by connecting each camera to a single receiver unit, syncing all the sources, scaling all the sources, then outputting a composited image. To implement such a system in a cloud-based environment according to an existing standard like SMPTE 2110-23 (multi-flows for single sources), the receiver unit would assume that all source flows have the exact intended time of the frame meaning each source node doing the processing and scaling of the image would need perfect synchronization. This is difficult under traditional approaches and not necessary under a pixel-based approach. Instead, each source can contribute its frames at different rates to update different portions of a frame buffer. During output, the frame buffer can be captured and serialized at the desired output frame rate, relieving the intermediate processing and production stages of the complex timing requirements. Furthermore, by introducing F2P stages and P2F stages, the pixel-based video approaches can remain compatible with legacy cameras and displays.

Figure 7:
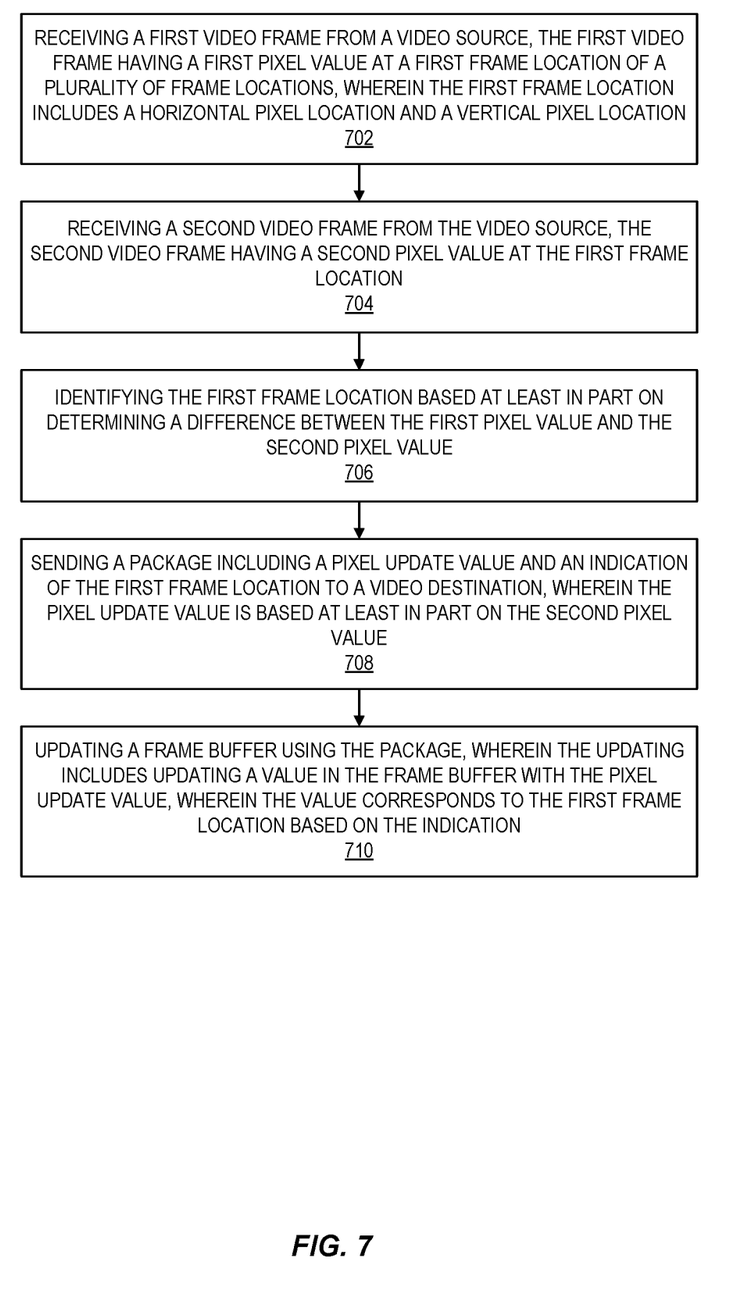
FIG. 7 is a flow diagram illustrating operations of a method for using dynamic pixel rate-based video according to some embodiments.

FIG. 7 is a flow diagram illustrating operations of a method for using dynamic pixel rate-based video according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by components of the system 150 of the other figures (e.g., on-prem electronic devices or cloud-based services).

The operations include, at block 702, receiving a first video frame from a video source, the first video frame having a first pixel value at a first frame location of a plurality of frame locations, wherein the first frame location includes a horizontal pixel location and a vertical pixel location, and, at block 704, receiving a second video frame from the video source, the second video frame having a second pixel value at the first frame location. For example, the F2P stage 120 receives frame-based video, which generally has a given pixel resolution, and individual pixels are identified by an x-y or horizontal-vertical coordinate pair.

The operations further include, at block 706, identifying the first frame location based at least in part on determining a difference between the first pixel value and the second pixel value. As described with reference to FIGS. 2 and 3, the locations of pixels that have changed between frames can be identified by comparing consecutive frames.

The operations further include, at block 708, sending a package including a pixel update value and an indication of the first frame location to a video destination, wherein the pixel update value is based at least in part on the second pixel value. As described with reference to FIG. 2, the encoder 215 can package pixel update data and metadata. The pixel update data can include absolute (e.g., the exact value of the pixel in the latest frame) or relative values (the value of the pixel relative to the previous frame). Additionally, the location of the pixels in the pixel update data can be specified in an absolute (the specific coordinates for each pixel) or relative (an identification of a group/region of pixels to be updated) manner Note that the package can include pixel update values for less than the number of pixels in a frame (e.g., those that have changed between the first frame and the second frame).

In some embodiments, the package can contain sufficient information to update the pixels that have changed in the second frame relative to the first frame and insufficient information to update the pixels that have not changed in the second frame relative to the first frame. For example, in some video transmission techniques, an intra-coded frame or I-frame can be transmitted with sufficient information to reconstruct an entire frame, while a predicted frame or P-frame can be transmitted with sufficient information to reconstruct an entire frame either expressly (e.g., changes) or implicitly (e.g., with reference to image information in a previous I-frame). In contrast, the package here can include insufficient information to reconstruct an entire frame (e.g., no reference to earlier frames), instead relying on a frame state as maintained by the recipient (e.g., the recipient will maintain a previously transmitted pixel value until it is updated by a later package).

The operations further include, at block 710, updating a frame buffer using the package, wherein the updating includes updating a value in the frame buffer with the pixel update value, wherein the value corresponds to the first frame location based on the indication. As described with reference to FIG. 6, the decoder 605 can perform partial updates to a frame buffer based on the contents of the packaged pixel-based video transmission.

Illustrative Systems

Figure 8:
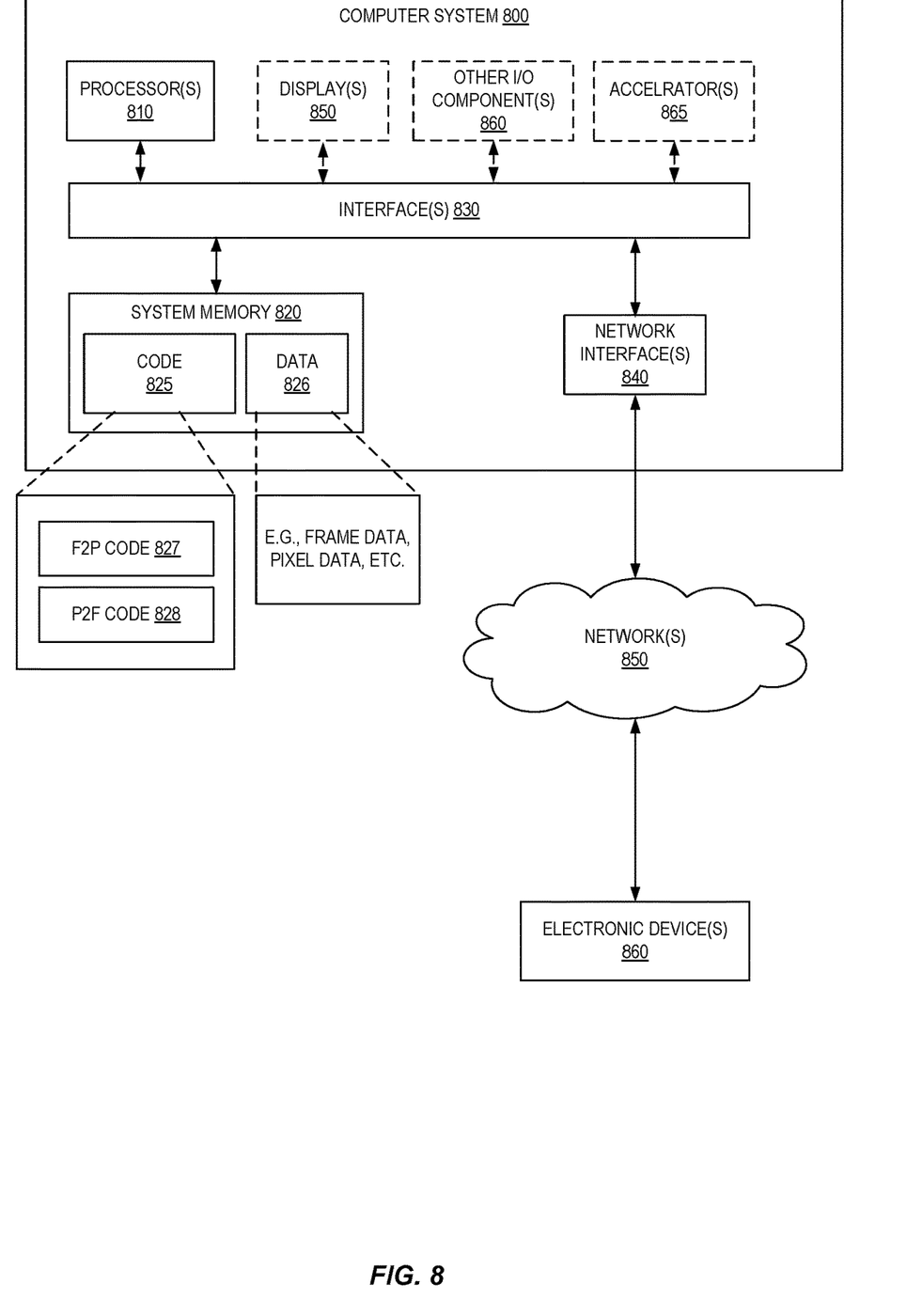
FIG. 8 is a block diagram illustrating an example computer system that may be used in some embodiments.

FIG. 8 is a block diagram illustrating an example computer system that may be used in some embodiments, such as computer systems to implement all or a portion of system 150. Exemplary computer system 800 includes one or more processors 810 coupled to a memory 820 via an interface 830. Computer system 800 further includes a network interface 840 coupled to the interface 830. Computer system 800 optionally includes one or more displays 850, one or more other input/output (I/O) components 860, and/or one or more accelerators 865. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

The system memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as code 825 and data 826. For example, the code 825 can include code for all or a portion of the F2P stage 120 (e.g., F2P code 827) and/or the P2F stage 130 (e.g., P2F code 828). The data 826 can include frame data, pixel deltas, pixel metadata, etc.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

The display(s) 850, such as a touch screen or liquid crystal display (LCD), convey visual information to a user, although some computer systems may not have a display at all (e.g., servers). The I/O components 860 provide facilities to the user for interacting with the computer system 800. Such I/O components 860 include, but are not limited to, speakers for rendering audio, keyboards, mice, or other input devices for receiving user inputs, microphones, cameras, other sensors, etc. for collecting data, etc. The accelerators 865 may provide hardware acceleration for frame-to-pixel and/or pixel-to-frame conversion operations.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving a first video frame from a video source, the first video frame having a first pixel value at a first frame location of a plurality of frame locations, wherein the first frame location includes a horizontal pixel location and a vertical pixel location;

receiving a second video frame from the video source, the second video frame having a second pixel value at the first frame location;

identifying the first frame location based at least in part on determining a first difference between the first pixel value and the second pixel value, wherein the first frame location is identified based on an accumulated difference being above a threshold, the accumulated difference being a sum of the first difference between the first pixel value and the second pixel value and a second difference between the first pixel value and a third pixel value, the third pixel value of a third video frame having the third pixel value at the first frame location; and sending a package including a pixel update value and an indication of the first frame location to a video destination, wherein the pixel update value is based at least in part on the second pixel value.

2. The computer-implemented method of claim 1:

wherein the package includes a plurality of pixel update values, wherein the pixel update value is one of the plurality of pixel update values, and wherein a number of the plurality of pixel update values represented in the package is less than a total number of pixels in the second video frame.

3. The computer-implemented method of claim 2, wherein the package contains sufficient information to update those of the pixels that have changed in the second video frame relative to the first video frame and insufficient information to update those of the pixels that have not changed in the second video frame relative to the first video frame.

4. The computer-implemented method of claim 1, wherein the pixel update value comprises:

a difference between the first pixel value and the third pixel value; or the second pixel value.

5. The computer-implemented method of claim 1, wherein the indication of the first frame location indirectly identifies the first frame location as part of a group of frame locations.

6. The computer-implemented method of claim 1, wherein the first video frame and the second video frame are part of a video having a first framerate, the first video frame having a first timestamp, the second video frame having a second timestamp, and further comprising:

generating a third timestamp based on a time of a clock corresponding to the second timestamp, wherein the package further includes the third timestamp.

7. The computer-implemented method of claim 6, wherein the clock is not synchronized to the first framerate.

8. A system comprising:

a first one or more electronic devices implementing a video processing stage; and a second one or more electronic devices implementing a frame-based video ingestion stage to:

receive a first video frame from a video source, the first video frame having a first pixel value at a first frame location of a plurality of frame locations, wherein the first frame location includes a horizontal pixel location and a vertical pixel location;

receive a second video frame from the video source, the second video frame having a second pixel value at the first frame location;

identify the first frame location based at least in part on a determined first difference between the first pixel value and the second pixel value wherein the first frame location is identified based on an accumulated difference being above a threshold, the accumulated difference being a sum of the first difference between the first pixel value and the second pixel value and a second difference between the first pixel value and a third pixel value, the third pixel value of a third video frame having the third pixel value at the first frame location; and send a package including a pixel update value and an indication of the first frame location to the video processing stage, wherein the pixel update value is based at least in part on the second pixel value.

9. The system of claim 8:

wherein the package includes a plurality of pixel update values, wherein the pixel update value is one of the plurality of pixel update values, and wherein a number of the plurality of pixel update values represented in the package is less than a total number of pixels in the second video frame.

10. The system of claim 9, wherein the package contains sufficient information to update those of the pixels that have changed in the second video frame relative to the first video frame and insufficient information to update those of the pixels that have not changed in the second video frame relative to the first video frame.

11. The system of claim 8, wherein the pixel update value comprises:

a difference between the first pixel value and the third pixel value; or the second pixel value.

12. The system of claim 8, wherein the indication of the first frame location indirectly identifies the first frame location as part of a group of frame locations.

13. The system of claim 8, wherein the first video frame and the second video frame are part of a video having a first framerate, the first video frame having a first timestamp, the second video frame having a second timestamp, and wherein the second one or more electronic devices implementing a frame-based video ingestion stage are further to:

generate a third timestamp based on a time of a clock corresponding to the second timestamp, wherein the clock is not synchronized to the first framerate, and wherein the package further includes the third timestamp.

14. A computer-implemented method comprising:

receiving a first video frame from a video source, the first video frame having a first pixel value at a first frame location of a plurality of frame locations, wherein the first frame location includes a horizontal pixel location and a vertical pixel location;

receiving a second video frame from the video source, the second video frame having a second pixel value at the first frame location, wherein the first video frame and the second video frame are part of a video having a first framerate, the first video frame having a first timestamp, the second video frame having a second timestamp;

generating a third timestamp based on a time of a clock corresponding to the second timestamp;

identifying the first frame location based at least in part on determining a first difference between the first pixel value and the second pixel value; and sending a package including a pixel update value and an indication of the first frame location to a video destination, wherein the pixel update value is based at least in part on the second pixel value, and wherein the package further includes the third timestamp.

15. The computer-implemented method of claim 14, wherein the clock is not synchronized to the first framerate.

16. The computer-implemented method of claim 14, wherein:
- the package includes a plurality of pixel update values, wherein the pixel update value is one of the plurality of pixel update values, and
- a number of the plurality of pixel update values represented in the package is less than a total number of pixels in the second video frame.

17. The computer-implemented method of claim 14, wherein the pixel update value is at least one of:
- the first difference between the first pixel value and the second pixel value; or
- the second pixel value.

18. A system comprising:
- a first one or more electronic devices implementing a video processing stage; and
- a second one or more electronic devices implementing a frame-based video ingestion stage to:
    - receive a first video frame from a video source, the first video frame having a first pixel value at a first frame location of a plurality of frame locations, wherein the first frame location includes a horizontal pixel location and a vertical pixel location;
    - receive a second video frame from the video source, the second video frame having a second pixel value at the first frame location, wherein the first video frame and the second video frame are part of a video having a first framerate, the first video frame having a first timestamp, the second video frame having a second timestamp;
    - generate a third timestamp based on a time of a clock corresponding to the second timestamp;
    - identify the first frame location based at least in part on a determined first difference between the first pixel value and the second pixel value; and
    - send a package including a pixel update value and an indication of the first frame location to the video processing stage, wherein the pixel update value is based at least in part on the second pixel value, and wherein the package further includes the third timestamp.

19. The system of claim 18, wherein the clock is not synchronized to the first framerate.

20. The system of claim 18, wherein:
- the package includes a plurality of pixel update values, wherein the pixel update value is one of the plurality of pixel update values, and
- a number of the plurality of pixel update values represented in the package is less than a total number of pixels in the second video frame.

* * * * *

UNITED STATES PATENT AND TRADEMARK OFFICE
CERTIFICATE OF CORRECTION

| | | |
|---|---|---|
| PATENT NO. | : 10,893,229 B1 | Page 1 of 1 |
| APPLICATION NO. | : 16/588623 | |
| DATED | : January 12, 2021 | |
| INVENTOR(S) | : Kevin Moore et al. | |

It is certified that error appears in the above-identified patent and that said Letters Patent is hereby corrected as shown below:

On the Title Page

The inventorship is updated as follows:
(72) Inventors: Kevin Moore, Portland, OR (US); Ryan Hegar, Portland, OR (US); Evan Statton, Geneva (CH)

Signed and Sealed this
Second Day of July, 2024

Katherine Kelly Vidal
*Director of the United States Patent and Trademark Office*